US012763648B2

(12) United States Patent
Verdoorn

(10) Patent No.: US 12,763,648 B2
(45) Date of Patent: Oct. 13, 2026

(54) ELECTRIC DRIVE UNIT

(71) Applicant: Dr. Ing. h. c. F. Porsche AG, Stuttgart (DE)

(72) Inventor: Werner Verdoorn, Ludwigsburg (DE)

(73) Assignee: Dr. Ing. h.c. F. Porsche Aktiengesellschaft, Stuttgart (DE)

(*) Notice: Subject to any disclaimer, the term of this patent is extended or adjusted under 35 U.S.C. 154(b) by 192 days.

(21) Appl. No.: 18/767,240

(22) Filed: Jul. 9, 2024

(65) Prior Publication Data

US 2025/0023433 A1 Jan. 16, 2025

(30) Foreign Application Priority Data

Jul. 10, 2023 (DE) ..................... 10 2023 118 194.7

(51) Int. Cl.

*H02K 11/33* (2016.01)
*H02K 1/20* (2006.01)
*H02K 5/22* (2006.01)

(52) U.S. Cl.

CPC ............... *H02K 11/33* (2016.01); *H02K 1/20* (2013.01); *H02K 5/225* (2013.01)

(58) Field of Classification Search

CPC .......... H02K 11/33; H02K 1/20; H02K 5/225; H02K 5/203

See application file for complete search history.

(56) References Cited

U.S. PATENT DOCUMENTS 6,198,183 B1 * 3/2001 Baeumel ................ H02K 5/225 310/52
10,780,849 B1 * 9/2020 Garcia ................ B60R 16/0231
2004/0090130 A1 * 5/2004 Kaneko .................. H02K 11/33 310/58
2005/0134124 A1 * 6/2005 Lieu ......................... H02K 5/10 310/43

* cited by examiner

*Primary Examiner* — Tulsidas C Patel
*Assistant Examiner* — Mohammed Ahmed Qureshi
(74) *Attorney, Agent, or Firm* — Buchanan Ingersoll & Rooney PC

(57) ABSTRACT

An electrical drive unit (2) for use in a motor vehicle, has a stator (4) for generating a magnetic field with a stator core and a plurality of stator windings, a rotor (6) for generating a torque based on an interaction with the magnetic field generated by the stator (4), a control unit (8) for controlling operation of the electric drive unit (2), power electronics (10) for power control and power supply of the electric drive unit (2). The stator (4) is connected electrically to the power electronics (10) and encapsulated to form a common stator power electronics unit (2').

19 Claims, 5 Drawing Sheets

ELECTRIC DRIVE UNIT

CROSS-REFERENCE TO RELATED APPLICATION

This application claims priority on German Patent Application No 10 2023 118 194.7 filed Jul. 10, 2023, the entire disclosure of which is incorporated herein by reference.

FIELD OF THE INVENTION

The invention relates to an electric drive unit for a motor vehicle, a method for manufacturing an electric drive unit, and a motor vehicle with such an electric drive unit.

BACKGROUND OF THE INVENTION

An electric drive machine, such as a brushless DC (BLCD) electric motor, has a rotor and a stator. The rotor has permanent magnets or electromagnets that interact with a magnetic field generated by the stator. This interaction drives the rotor rotationally and generates a torque. The magnetic field generated by the stator is generated via corresponding power electronics.

A large amount of heat results in the generation of the magnetic field. In extreme cases this heat leads to thermal damage to the stator, the power electronics, and other nearby components. Cooling devices are arranged in housings near the stator and the power electronics to dissipate the heat generated at the stator.

An electrical connection between the stator and the power electronics is generated via electrical connections arranged between the elements or the respective housings. These connection points between the elements are susceptible to short circuits due to corrosion or vibration damage. Thus, the connection points pose a major safety problem and cause unnecessary costs.

An object of the invention is to remedy the above-described disadvantages by providing an electric drive unit for a motor vehicle that enables safe reliable drive of high-performance machines in a simple and cost-effective manner.

Features and details of the invention will become apparent from the following description and the drawings. Technical features that are disclosed regarding the electric drive unit of the invention also apply to the method or the motor vehicle of the invention, and vice versa. Thus, reference is or can always be mutually made with respect to the disclosure regarding the individual aspects of the invention.

SUMMARY OF THE INVENTION

One aspect of the invention relates to an electric drive unit for a motor vehicle. The electric drive unit comprises a stator, a rotor, a control unit and power electronics. The stator has a stator core and stator windings and functions to generate a magnetic field. The rotor generates a torque based on an interaction with the magnetic field generated by the stator. The control unit for controls operation of the electric drive unit and the power electronics for power control and power supply of the electric drive unit. The stator is connected electrically to the power electronics and is encapsulated to form a common stator power electronics unit.

The electric drive unit provides a safe reliable drive of high-performance machines in a simple and cost-efficient manner by encapsulating the stator and the power electronics. Additionally, heat can be dissipated more effectively and short circuits can be avoided more reliably in comparison to known electric drive units.

The electric drive unit of some embodiments can be used in a motor vehicle, such as a car or a truck. However, the use in other vehicles, such as commercial vehicles, ships, or airplanes, is conceivable. The electric drive unit of some embodiments is a brushless DC (BLCD) electric motor. Encapsulating or encapsulation can be understood in the context of the invention as a material-locking connection of a stator with associated power electronics to form a single unit. A corresponding encapsulation or encapsulating material, such as a resin or an injection molding material, can act as the connection means. In this way, an electrical connection between a stator and associated power electronics can be configured securely and irremovably.

The power electronics can comprise at least one capacitor and/or a control board and/or a pulse inverter and/or electrical switching units, in particular transistors, to provide a flexible and quickly adaptable power control as well as an effective and flexibly controllable power supply. This embodiment provides controlled power control, commutation, and speed control of the electric drive unit and ensures safe and energy-efficient operation of the drive unit.

At least part of the power electronics may have a frame enclosure to achieve effective protection of the power electronics. The frame of some embodiments is formed from a lightweight and non-magnetizable material, such as aluminum or plastic.

Some embodiments have cooling channels to cool the power electronics and the stator by dissipating heat from the electric drive unit, and particularly from the stator power electronics unit. The cooling channels may be arranged in the common stator power electronics unit and may be distributed symmetrically within the stator power electronics unit. The cooling channels in the stator power electronics unit dissipate heat at the main source of the heat, and thus prevent thermal damage particularly effectively. More than six, in particular more than ten, cooling channels can be provided and can be arranged point-symmetrically about an axis of rotation of the rotor.

Terminals are provided in some embodiments for tapping a voltage to provide simple and safe circuitry of the electrical drive unit. For example, at least one low voltage terminal is provided for tapping a low voltage and a high voltage terminal is provided for tapping a high voltage. The low voltage terminal and/or the high voltage terminal may be at least partially encapsulated with the stator power electronics unit. Alternatively, the terminals can be inserted through a housing using rotationally symmetric cylinders, for example, and sealed to the outside with sealing elements, such as O-rings. Alternatively, a bonding or an encapsulation may be provided.

Protection of the power electronics can be enhanced by a protective coating between the power electronics and an encapsulation material. The protective coating can be an alternate or an addition to a frame for enclosing at least a part of the power electronics.

Some embodiments have a housing for receiving the stator power electronics unit to protect for the entire electric drive unit and especially the stator power electronics unit. The housing may be formed from a non-magnetizable material, such as aluminum, and can be sealed in a media-tight manner.

A gap may exist between the stator power electronics unit and the housing for the passage of a coolant. The gap may be connected fluidically to the cooling channels and is very effective for dissipating heat from the electric drive unit, and particularly from the stator power electronics unit. Some embodiments have regulation elements in the cooling channel and/or in the gap for regulating the flow of a cooling fluid. The regulation elements may be flow control devices for targeted guidance of the cooling fluid.

The invention also relates to a method for manufacturing an electric drive motor. The method comprises arranging a rotor, a control unit, and power electronics at or within a stator to generate a magnetic field; establishing an electrical connection between the power electronics and the stator; and encapsulating the stator with the power electronics to form a common stator power electronics unit. The method thus has the same advantages as already described with respect to the electric drive motor.

A particularly simple, cost-effective, and flexible manufacturing method may use injection molding for the encapsulation of the stator with the power electronics to form a common stator power electronics unit.

The invention also relates to a motor vehicle comprising an electric drive unit as described above. The motor vehicle of the invention has the same advantages as the electric drive unit described above.

Further advantages, features, and details of the invention arise from the following description and drawings. The features mentioned in the claims and in the description can be inventions individually or in any combination.

DETAILED DESCRIPTION

Figure 1:
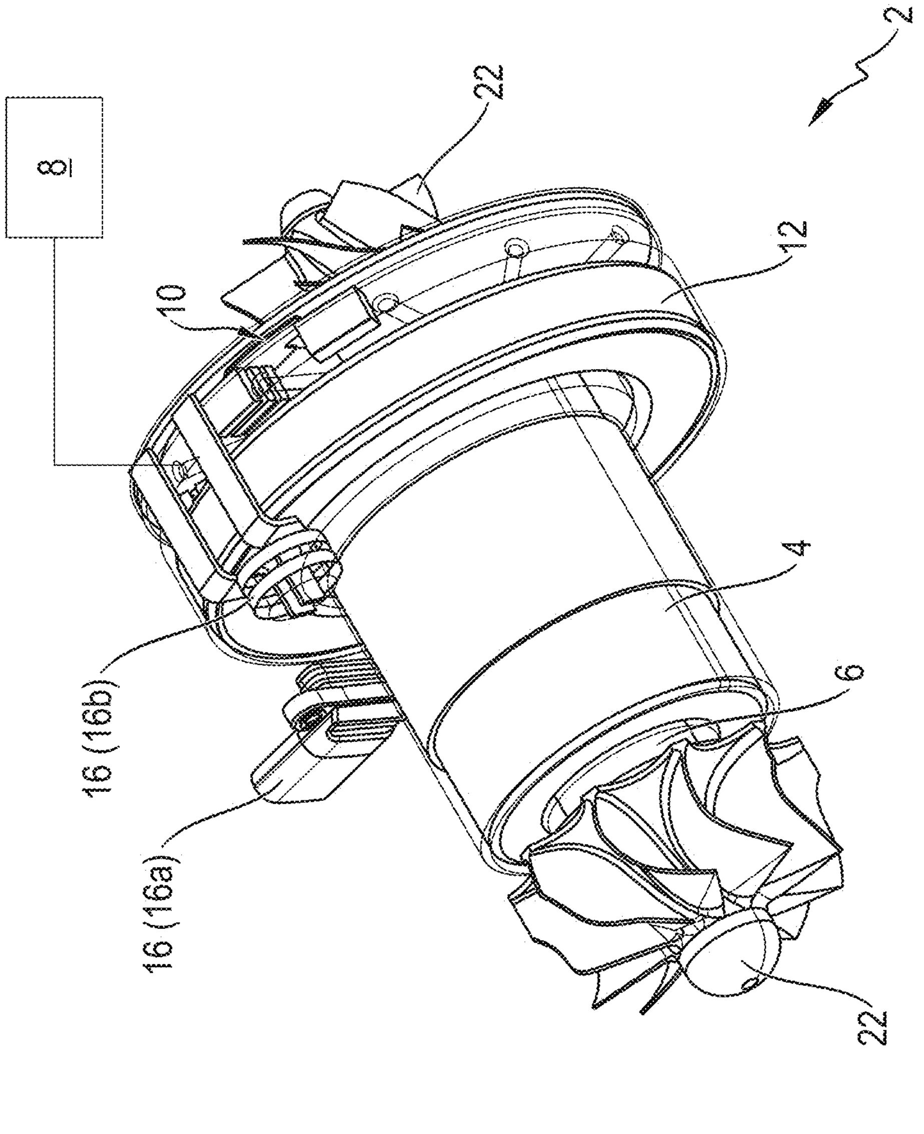
FIG. 1 is a perspective view a first embodiment of an electric drive unit for use in a motor vehicle illustrated without encapsulation material.

FIG. 1 is a perspective view of a first embodiment of an electric drive unit 2 according to the invention for use in a motor vehicle. Encapsulation material will be part of the electric drive unit 2 as described below and illustrated in FIGS. 2A and 2B. The electric drive unit 2 comprises a stator 4, a rotor 6, a control unit 8 and power electronics 10. The stator 4 has a stator core and stator windings and functions to generate a magnetic field. The rotor 6 generates torque based on an interaction with the magnetic field generated by the stator 4. The control unit 8 controls operation of the electric drive unit 2, and the power electronics 10 functions for the power control and power supply of the electric drive unit 2. The stator 4 is connected electrically to the power electronics 10. The power electronics 10 comprise a frame 12 for enclosure and may comprise at least one capacitor and/or a control board and/or a pulse inverter and/or electrical switching units, in particular transistors.

Terminals 16 are provided for tapping a voltage and include a low voltage terminal 16*a* for tapping a low voltage and a high voltage terminal 16*b* for tapping a high voltage. In addition, turbine wheels 22 are arranged at the ends.

Figures 2A, 2B:
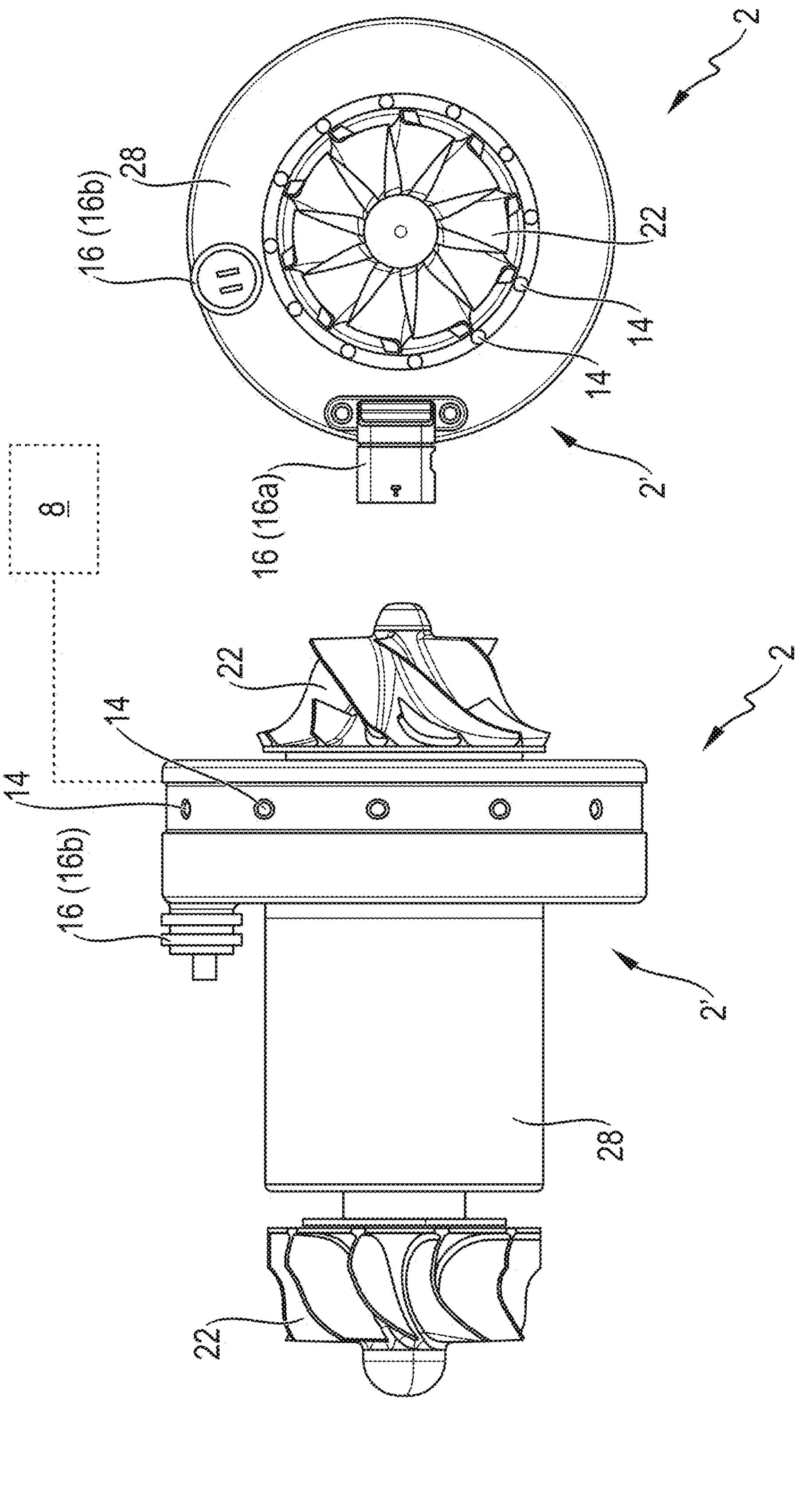
FIG. 2A is a left side view of the electric drive unit with encapsulation and FIG. 2B is a front view of the electric drive unit of FIG. 2A for use in a motor vehicle.

FIGS. 2A and 2B show the electric drive unit 2 encapsulated with an encapsulation material 28. Cooling channels 14 for cooling the power electronics 10 and the stator 4 are incorporated into the encapsulation material 28 of the common stator power electronics unit 2' and are distributed symmetrically within the stator power electronics unit 2'.

Figure 3:
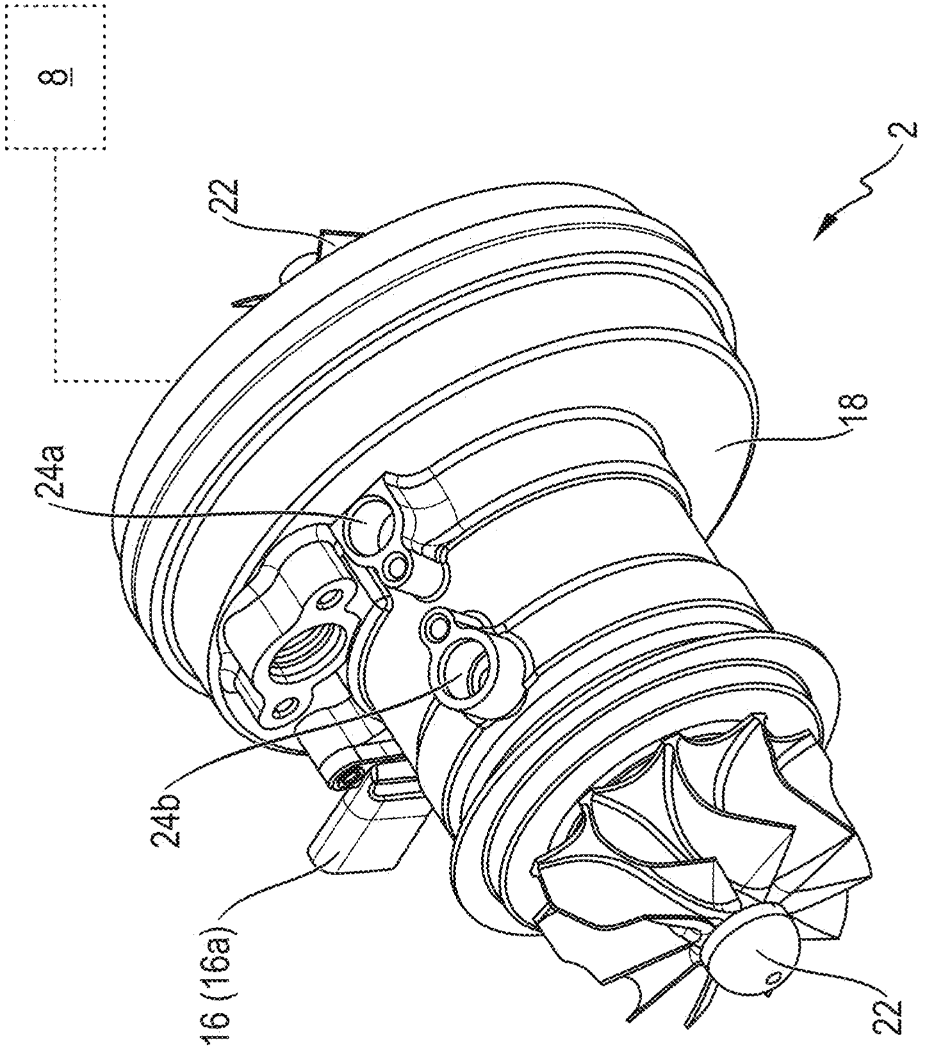
FIG. 3 is perspective view of a second embodiment of an encapsulated electric drive unit for a motor vehicle.

FIG. 3 shows an encapsulated electric drive unit 2 according to a second embodiment for use in a motor vehicle. The electric drive unit 2 of FIG. 3 comprises a housing 18 for receiving the stator power electronics unit 2'. The housing 2 of FIG. 3 is manufactured from an aluminum material, and comprises an inlet opening 24*a* and an outlet opening 24*b* for a cooling channel 14 or for cooling water.

Figure 4B:
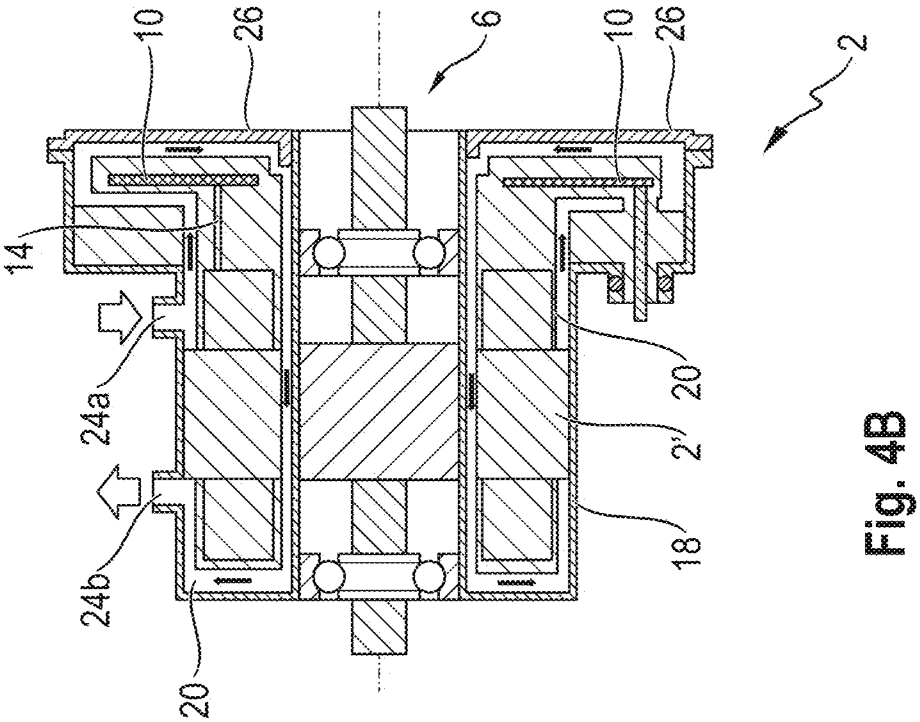
FIGS. 4A and 4B are cross-sectional views of the encapsulated electric drive unit of FIG. 3 without a rotor in FIG. 4A and with a rotor in FIG. 4B.
Figure 4A:
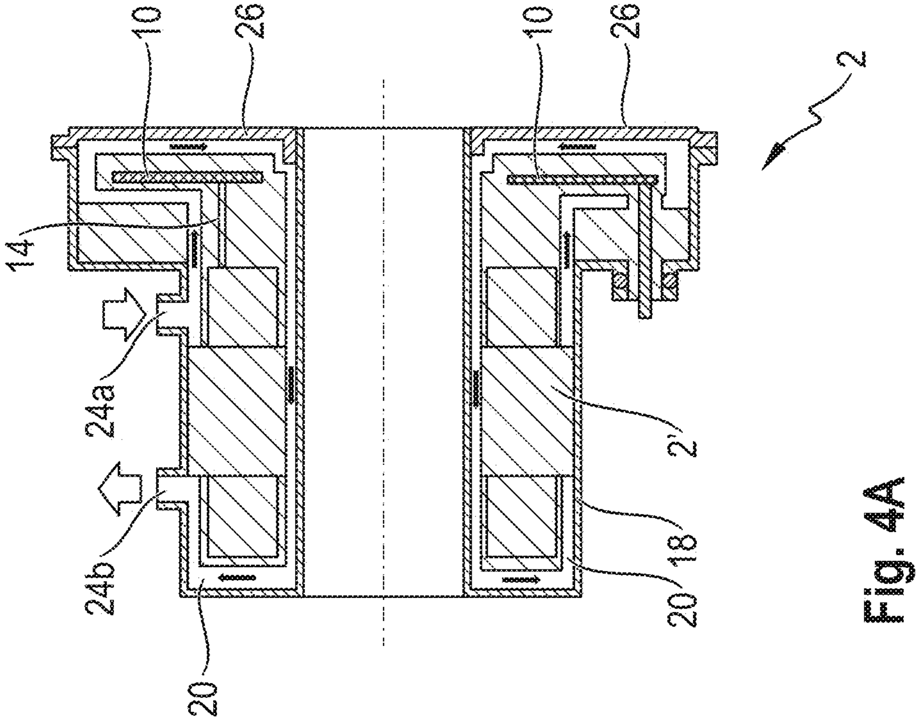

FIGS. 4A and 4B are cross-sectional views of the encapsulated electric drive unit 2 of FIG. 3. The rotor is not shown in FIG. 4A, but a rotor 6 is shown in FIG. 4B.

FIGS. 4A and 4B show a gap 20 between the stator power electronics unit 2' and the housing 18. The gap 20 is connected fluidically to the cooling channels 14 and accommodates a passage of a coolant. In addition, a cover 26 is arranged on the end.

Figure 5:
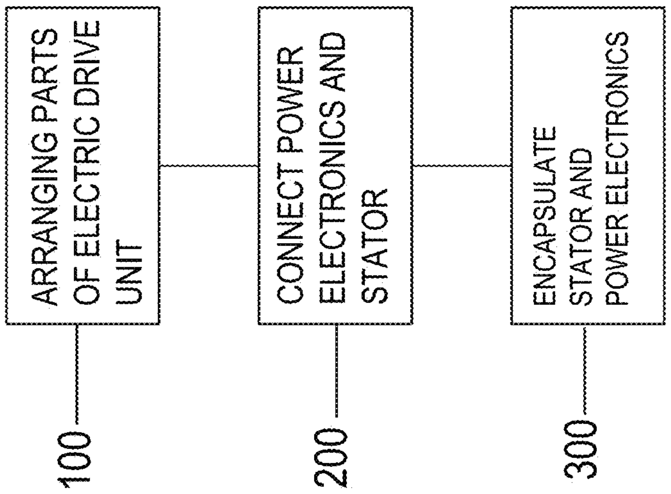
FIG. 5 a flow chart showing the sequence of steps of a method according to the invention for producing an electric drive unit for use in a motor vehicle.

FIG. 5 shows a schematic sequence of the individual steps of a method according to the invention for manufacturing an electric drive unit 2 for use in a motor vehicle.

The method comprises: a step 100 of arranging a rotor 6, a control unit 8, and power electronics 10 at or within a stator 4 to generate a magnetic field; a step 200 of establishing an electrical connection between the power electronics 10 and the stator 4, and a step 300 of encapsulating the stator 4 with the power electronics 10 to form a common stator power electronics unit 2'.

The step 300 of encapsulating the stator 4 with the power electronics 10 to form a common stator power electronics unit 2' can be carried out by an injection molding process.

The preceding explanation describes the invention solely in the context of examples.

Individual features of the embodiments can be combined with one another insofar as they are technically advantageous without departing from the scope of the invention.

The invention claimed is:

1. An electric drive unit (2) for use in a motor vehicle, comprising:

a stator (4) for generating a magnetic field, the stator having a stator core and stator windings;

a rotor (6) for generating a torque based on an interaction with the magnetic field generated by the stator (4);

a housing (18) defining a hollow interior space in which the stator (4) is arranged and a cooling channel (14) through which a cooling fluid flows for cooling the stator (4);

a control unit (8) for controlling operation of the electric drive unit (2); and power electronics (10) for power control and power supply of the electric drive unit (2), wherein the power electronics (10) are also arranged within the hollow interior space and are in direct fluid communication with the cooling channel (14) and the cooling fluid, wherein the stator (4) is connected electrically to the power electronics (10).

2. The electric drive unit (2) of claim 1, wherein the power electronics (10) comprise at least one capacitor and/or a control board and/or a pulse inverter and/or electrical switching units.

3. The electric drive unit (2) of claim 1, further comprising a frame (12) for housing at least a part of the power electronics (10).

4. The electric drive unit (2) of claim 1, wherein the cooling channels (14) are arranged for cooling the power electronics (10) and the stator (4), the cooling channels (14) being distributed symmetrically within the stator (4).

5. The electric drive unit (2) of claim 1, further comprising at least one low voltage terminal (16*a*) for tapping a low voltage and a high voltage terminal (16*b*) for tapping a high voltage, the low voltage terminal (16*a*) and the high voltage terminal (16*b*) being at least partially encapsulated with the stator (4).

6. The electric drive unit (2) of claim 1, further comprising a protective coating arranged between the power electronics (10) and an encapsulation material (28) for protecting the power electronics (10).

7. The electric drive unit (2) of claim 1, the housing (18) being formed from a non-magnetizable material.

8. The electric drive unit (2) of claim 7, further comprising a gap (20) disposed between the stator (4) and the housing (18), the gap (20) being connected fluidically to the cooling channels (14).

9. A motor vehicle (100) comprising the electric drive unit (2) of claim 1.

10. A method for manufacturing an electric drive unit (2) for use in a motor vehicle, the electric drive unit (2) having a rotor (6), a stator (4), a control unit (8) and power electronics (10), the method comprising:

arranging (100) within a hollow interior space of a housing (18) (*i*) the stator (4) having cooling channel (14) through which a cooling fluid flows for cooling the stator (4) and (ii) the power electronics (10) that are in direct fluid communication with the cooling channel (14) and the cooling fluid;

establishing (200) an electrical connection between the power electronics (10) and the stator (4); and encapsulating (300) the stator (4) and the power electronics (10) together in a mold to form an encapsulated unit.

11. The method of claim 10, wherein the encapsulating (300) takes place by insert injection molding.

12. The electric drive unit (2) of claim 1, wherein the power electronics (10) and the stator (4) are insert injection molded together such that the cooling channel (14) extends within a mold directly between the power electronics (10) and the stator (4).

13. The electric drive unit (2) of claim 1, wherein the power electronics (10) comprises a capacitor.

14. The electric drive unit (2) of claim 1, wherein the power electronics (10) comprises a pulse inverter.

15. The electric drive unit (2) of claim 1, wherein the rotor (6) is positioned outside of the housing (18).

16. The method of claim 10, wherein the rotor (6) is positioned outside of the housing (18).

17. The electric drive unit (2) of claim 1, wherein the cooling channel (14) extends directly between exterior surfaces of the stator (4) and the power electronics (10).

18. The method of claim 10, wherein the cooling channel (14) extends directly between exterior surfaces of the stator (4) and the power electronics (10).

19. The method of claim 10, wherein the stator (4) and the power electronics (10) are insert molded together in an injection molding operation to form the encapsulated unit.

* * * * *